United States Patent
Miyagishima

(10) Patent No.: US 11,546,493 B2
(45) Date of Patent: Jan. 3, 2023

(54) FINDER AND IMAGING DEVICE

(71) Applicant: FUJIFILM Corporation, Tokyo (JP)

(72) Inventor: Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 282 days.

(21) Appl. No.: 16/882,175

(22) Filed: May 22, 2020

(65) Prior Publication Data

US 2020/0382684 A1    Dec. 3, 2020

(30) Foreign Application Priority Data

May 29, 2019  (JP) .............................. JP2019-100681

(51) Int. Cl.
| | | |
|---|---|---|
| H04N 5/225 | (2006.01) | |
| G02B 9/10 | (2006.01) | |
| G02B 9/12 | (2006.01) | |

(52) U.S. Cl.
CPC ............. *H04N 5/2254* (2013.01); *G02B 9/10* (2013.01); *G02B 9/12* (2013.01)

(58) Field of Classification Search
CPC .......... G02B 9/12; G02B 9/10; H04N 5/2254
USPC ....................................................... 396/382
See application file for complete search history.

(56) References Cited

U.S. PATENT DOCUMENTS

| | | | | |
|---|---|---|---|---|
| 2012/0038991 A1* | 2/2012 | Miyano | ............... | G02B 23/14 |
| | | | | 359/643 |
| 2016/0209726 A1 | 7/2016 | Kanai | | |
| 2017/0059833 A1* | 3/2017 | Saito | ................. | G02B 13/04 |

FOREIGN PATENT DOCUMENTS

| | | |
|---|---|---|
| JP | S64-81925 A | 3/1989 |
| JP | H04-19610 A | 1/1992 |
| JP | 2007-328160 A | 12/2007 |
| JP | 2012-042569 A | 3/2012 |
| JP | 2016-139131 A | 8/2016 |
| JP | 2017-044764 A | 3/2017 |
| JP | 6363570 B2 | 7/2018 |

OTHER PUBLICATIONS

An Office Action; "Notice of Reasons for Refusal," mailed by the Japanese Patent Office dated Aug. 30, 2022, which corresponds to Japanese Patent Application No. 2019-100681 and is related to U.S. Appl. No. 16/882,175; with English language translation.

* cited by examiner

*Primary Examiner* — James R Greece
(74) *Attorney, Agent, or Firm* — Studebaker & Brackett PC

(57) ABSTRACT

The finder includes, in order from an object side to an eye point side, a negative objective lens group, and a positive eyepiece lens group. The eyepiece lens group consists of, in order from the object side to the eye point side, a negative first lens, a positive second lens, and a negative third lens. During diopter adjustment, only the second lens moves. The finder satisfies a conditional expression determined in advance.

15 Claims, 12 Drawing Sheets

EXAMPLE 1: OBSERVATION OPTICAL SYSTEM

EXAMPLE 1: DISPLAY OPTICAL SYSTEM

EXAMPLE 2: OBSERVATION OPTICAL SYSTEM

EXAMPLE 2: DISPLAY OPTICAL SYSTEM

EXAMPLE 3: OBSERVATION OPTICAL SYSTEM

EXAMPLE 3: DISPLAY OPTICAL SYSTEM

EXAMPLE 4: OBSERVATION OPTICAL SYSTEM

EXAMPLE 4: DISPLAY OPTICAL SYSTEM

EXAMPLE 5: OBSERVATION OPTICAL SYSTEM

EXAMPLE 5: DISPLAY OPTICAL SYSTEM

EXAMPLE 1

EXAMPLE 5

FINDER AND IMAGING DEVICE

CROSS-REFERENCE TO RELATED APPLICATIONS

The present application claims priority under 35 U.S.C. § 119 to Japanese Patent Application No. 2019-100681, filed on May 29, 2019. The above application is hereby expressly incorporated by reference, in its entirety, into the present application.

BACKGROUND OF THE INVENTION

1. Field of the Invention

The present disclosure relates to a finder and an imaging device.

2. Description of the Related Art

In the related art, a reverse Galileo type finder is known as a finder of a camera or the like. For example, JP2012-042569A and JP6363570B disclose a finder comprising an objective lens group having a negative refractive power, and an eyepiece lens group having a positive refractive power.

SUMMARY OF THE INVENTION

In order to improve visibility, a finder that can perform a diopter adjustment and has a high angular magnification is demanded. Furthermore, reduction in size of the finder is demanded along with reduction in size of an imaging device. In particular, in a finder that moves a lens to perform diopter adjustment, it is required that an amount of movement of the lens at the time of diopter adjustment is suppressed, and reduction in size can be achieved.

In JP2012-042569A, there is no description relating to a specific method of diopter adjustment. An optical system described in JP6363570B has room for improvement in achieving both of reduction in size and a high angular magnification.

The present disclosure has been accomplished in view of the above-described circumstances, and an object of the present disclosure is to provide a finder that has a diopter adjustment function, achieves both of reduction in size and a high angular magnification, and maintains satisfactory optical performance, and an imaging device comprising the finder.

An aspect of the present disclosure provides a reverse Galileo type finder comprising, in order from an object side to an eye point side, an objective lens group having a negative refractive power, and an eyepiece lens group having a positive refractive power. A lens distance between the objective lens group and the eyepiece lens group is longest among lens distances at an air conversion length in an observation optical system from the objective lens group to the eyepiece lens group. The eyepiece lens group consists of, in order from the object side to the eye point side, a first lens having a negative refractive power, a second lens having a positive refractive power, and a third lens having a negative refractive power. During diopter adjustment, the first lens and the third lens remain stationary with respect to an eye point, and the second lens moves along an optical axis. In a case where an angular magnification of the observation optical system in a state in which a diopter is −1 is M, a focal length of the third lens is f3, and a sum of a thickness of the objective lens group on the optical axis, a thickness of the eyepiece lens group on the optical axis, and an air conversion length on the optical axis from a most eye point-side lens surface of the objective lens group to a most object-side lens surface of the eyepiece lens group is AL, a conditional expression (1) is satisfied.

$$0.01 < -(M/f3) \times AL < 0.16 \tag{1}$$

In the finder of the above-described aspect, it is preferable that a conditional expression (1-1) is satisfied.

$$0.02 < -(M/f3) \times AL < 0.15 \tag{1-1}$$

In the finder of the above-described aspect, it is preferable that, in a case where the sum of the thickness of the objective lens group on the optical axis, the thickness of the eyepiece lens group on the optical axis, and the air conversion length on the optical axis from the most eye point-side lens surface of the objective lens group to the most object-side lens surface of the eyepiece lens group is AL, and a focal length of the second lens is f2, a conditional expression (2) is satisfied. It is more preferable that a conditional expression (2-1) is satisfied.

$$1 < AL/f2 < 2 \tag{2}$$

$$1.2 < AL/f2 < 1.8 \tag{2-1}$$

In the finder of the above-described aspect, it is preferable that, in a case where a focal length of the eyepiece lens group is fP, and the focal length of the third lens is f3, a conditional expression (3) is satisfied. It is more preferable that a conditional expression (3-1) is satisfied.

$$0.15 < -fP/f3 < 0.45 \tag{3}$$

$$0.2 < -fP/f3 < 0.4 \tag{3-1}$$

In the finder of the above-described aspect, it is preferable that, in a case where a refractive index of the third lens with respect to d line is NdLb3, a conditional expression (4) is satisfied. It is more preferable that a conditional expression (4-1) is satisfied.

$$1.48 < NdLb3 < 1.66 \tag{4}$$

$$1.5 < NdLb3 < 1.64 \tag{4-1}$$

In the finder of the above-described aspect, it is preferable that, in a case where a focal length of the objective lens group is fN, and the focal length of the third lens is f3, a conditional expression (5) is satisfied. It is more preferable that a conditional expression (5-1) is satisfied.

$$0.05 < fN/f3 < 0.25 \tag{5}$$

$$0.1 < fN/f3 < 0.2 \tag{5-1}$$

The finder of the above-described aspect may further comprise another optical system that is different from the observation optical system outside an optical path of the observation optical system and comprises a display element, and an optical path combination member that combines an optical path of the other optical system and the optical path of the observation optical system between the objective lens group and the eyepiece lens group.

In the configuration in which the finder of the above-described aspect further comprises the other optical system and the optical path combination member, it is preferable that, in a case where the focal length of the objective lens group is fN, and a distance on the optical axis from a most object-side surface of the objective lens group to a most object-side surface of the optical path combination member is BL, a conditional expression (6) is satisfied. It is more preferable that a conditional expression (6-1) is satisfied.

$$-5.5 < fN/BL < -1.5 \quad (6)$$

$$-5 < fN/BL < -2 \quad (6\text{-}1)$$

In a case where the finder of the above-described aspect further comprises the other optical system and the optical path combination member, it is preferable that the other optical system comprises, as lenses, only three lenses consisting of two lenses having a positive refractive power and one lens having a negative refractive power.

An imaging device according to another aspect of the present disclosure comprises the finder according to the aspect of the present disclosure.

In the specification, it should be noted that the terms "consisting of ~" and "consists of ~" mean that not only the above-described components but also lenses substantially having no refractive power, optical elements, such as a stop, a filter, and a cover glass, other than lenses, and a lens flange, a lens barrel, an imaging element, and the like may be included.

In the specification, it should be noted that the term "~group having a positive refractive power" means that the group has a positive refractive power as a whole. Similarly, the term "~group having a negative refractive power" means that the group has a negative refractive power as a whole. The "lens having a positive refractive power" and the "positive lens" are synonymous. The "lens having a negative refractive power" and the "negative lens" are synonymous. The "~lens group" does not necessarily consist of a plurality of lenses, but may consist of only one lens.

A composite aspheric lens (a lens that is integrally composed of a spherical lens and an aspheric-shaped film formed on the spherical lens, and functions as one aspheric lens as a whole) is not regarded as a cemented lens, and is treated as one lens. A sign of a refractive power and a surface shape relating to a lens including an aspheric surface are considered in a paraxial region unless otherwise specified.

The "focal length" used in the conditional expressions is a paraxial focal length. The "distance on the optical axis" and the "thickness on the optical axis" used in the conditional expressions are considered at a geometrical length, not an air conversion length, unless otherwise specified. The values used in the conditional expressions are values that are obtained with respect to d line. "d line", "C line", and "F line" described in the specification are emission lines, a wavelength of d line is 587.56 nm (nanometer), a wavelength of C line is 656.27 nm (nanometer), and a wavelength of F line is 486.13 nm (nanometer).

According to the present disclosure, it is possible to provide a finder that has a diopter adjustment function, achieves both of reduction in size and a high angular magnification, and maintains satisfactory optical performance, and an imaging device comprising the finder.

DESCRIPTION OF THE PREFERRED EMBODIMENTS

Figure 1:
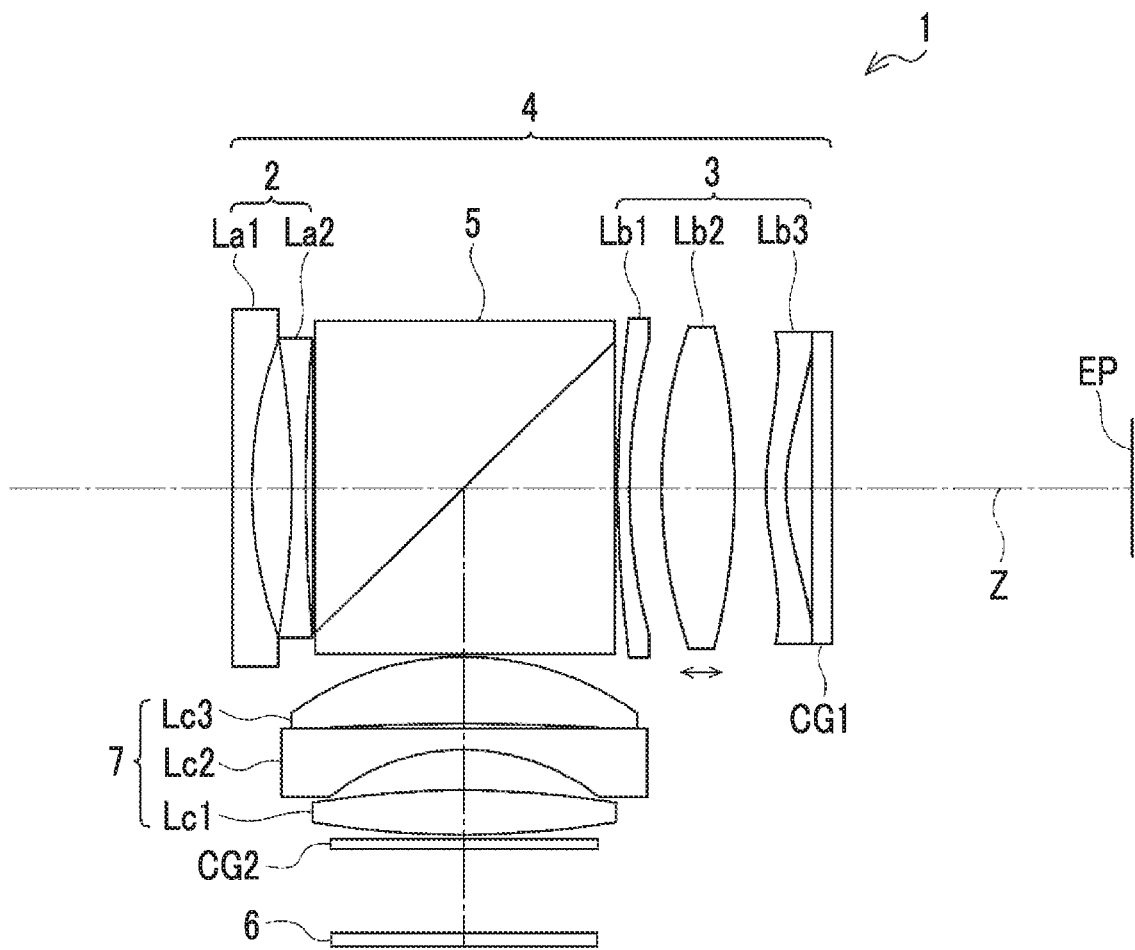
FIG. 1 is a cross-sectional view showing the configuration of a finder according to an embodiment of the present disclosure.

Hereinafter, an embodiment of the present disclosure will be described in detail referring to the drawings. FIG. 1 shows the configuration of a finder 1 according to an embodiment of the present disclosure on a cross section including an optical axis Z. An example shown in FIG. 1 corresponds to Example 1 described below. In FIG. 1, a left side is an object side, and a right side is an eye point side. An eye point EP shown in FIG. 1 does not indicate a shape, but indicates a position on the optical axis.

The finder 1 shown in FIG. 1 is a reverse Galileo type finder, and comprises, in order from an object side to an eye point side along the optical axis Z, an objective lens group 2 having a negative refractive power and an eyepiece lens group 3 having a positive refractive power. FIG. 1 shows an example where an optical path combination member 5 is disposed between the objective lens group 2 and the eyepiece lens group 3, and a cover glass CG1 is disposed between the eyepiece lens group 3 and the eye point EP. The optical path combination member 5 and the cover glass CG1 are optical members having no refractive power. Hereinafter, an optical system that consists of optical members disposed along an optical path from the objective lens group 2 to the eyepiece lens group 3 is referred to as an observation optical system 4. That is, the observation optical system 4 in the example of FIG. 1 consists of the objective lens group 2, the optical path combination member 5, and the eyepiece lens group 3. In the example of FIG. 1, light from an object is incident on the eye point EP by way of the observation optical system 4 and the cover glass CG1.

The objective lens group 2 and the eyepiece lens group 3 are disposed such that a lens distance between the objective lens group 2 and the eyepiece lens group 3 is longest among lens distances at an air conversion length in the observation optical system 4. The term "lens distance at an air conversion length" used herein is a distance at the air conversion length between adjacent lenses in an optical axis direction. In a case where a member having no refractive power is disposed between the lenses, the member is converted as air.

As an example, the objective lens group 2 of FIG. 1 consists of, in order from the object side to the eye point side, two lenses of a lens La1 having a negative refractive power and a lens La2 having a negative refractive power.

The eyepiece lens group 3 consists of, in order from the object side to the eye point side, three lenses of a first lens Lb1 having a negative refractive power, a second lens Lb2 having a positive refractive power, and a third lens Lb3 having a negative refractive power. During diopter adjustment, the first lens Lb1 and the third lens Lb3 remain stationary with respect to the eye point EP, and the second lens Lb2 moves along the optical axis Z. That is, in the finder 1, diopter adjustment is performed by moving only the second lens Lb2.

The eyepiece lens group 3 having a positive refractive power is composed as described above, whereby it is possible to increase the refractive power of the second lens Lb2 that is a positive lens. Then, diopter adjustment is performed by moving the second lens Lb2, whereby it is possible to suppress an amount of movement per diopter adjustment amount. The signs of the refractive power of the lenses composing the eyepiece lens group 3 are set in an arrangement order of negative, positive, and negative from the object side, whereby there is an advantage in suppressing the size of the optical system outward in a radial direction while securing the distance between the objective lens group 2 and the eyepiece lens group 3. Accordingly, the finder 1 has a configuration advantageous for achieving reduction in size while securing an appropriate diopter adjustment amount.

More specifically, it is preferable that the first lens Lb1 has a surface concave toward the eye point side. In this case, it becomes easy to correct a field curvature. It is preferable that the second lens Lb2 is a biconvex lens in order to secure a high refractive power. The third lens Lb3 may be an aspheric lens in order to obtain more satisfactory optical performance.

As shown in FIG. 1, the finder 1 comprises another optical system that is different from the observation optical system 4 outside an optical path of the observation optical system 4, and may comprise the optical path combination member 5 that combines an optical path of the other optical system and the optical path of the observation optical system 4 between the objective lens group 2 and the eyepiece lens group 3. FIG. 1 shows an example where a half prism is used as the optical path combination member 5. The half prism includes a film that splits incident light into transmitted light and reflected light.

It is preferable that the other optical system comprises a display element 6. As an example, the other optical system shown in FIG. 1 consists of, in order from the optical path combination member side, an element-side lens group 7, a cover glass CG2, and the display element 6. The display element 6 is, for example, a liquid crystal element, an organic electro-luminescence (EL) element, or the like. The display element 6 displays at least one of a field frame, a distance measurement area, imaging conditions, various kinds of information, a captured image, or the like. The cover glass CG2 is an optical member having no refractive power.

Light from the display element 6 is incident on the optical path combination member 5 by way of the cover glass CG2 and the element-side lens group 7, and is incident on the eye point EP by way of the eyepiece lens group 3 and the cover glass CG1 after an optical path is bent by the optical path combination member 5. In this way, the optical path of the other optical system is combined with the optical path of the observation optical system 4, whereby it is possible to display the field frame, various kinds of information, and the like on an observation image obtained by the observation optical system 4 in a superimposed manner. Hereinafter, an optical system that consists of members disposed along an optical path from the display element 6 to the eyepiece lens group 3 is referred to as a display optical system. The optical path of the observation optical system is used as an optical path of an optical view finder, and the optical path of the display optical system is used as an optical path of an electronic view finder, whereby a hybrid finder (Registered Trademark) can be composed.

It is preferable that the other optical system comprises, as lenses, only three lenses of two lenses having a positive refractive power and one lens having a negative refractive power. In such a case, in a lens system included in the display optical system, that is, in a lens system in which the element-side lens group 7 and the eyepiece lens group 3 are combined in the example of FIG. 1, the number of negative lenses and the number of positive lenses are the same, and it becomes easy to correct aberrations in the other optical system. The element-side lens group 7 in the example of FIG. 1 consists of, in order from the display element side, a lens Lc1 having a positive refractive power, a lens Lc2 having a negative refractive power, and a lens Lc3 having a positive refractive power.

Next, configurations relating to conditional expressions will be described. In the finder 1, in a case where an angular magnification of the observation optical system 4 in a state in which a diopter is −1 is M, a focal length of the third lens Lb3 is f3, and a sum of a thickness of the objective lens group 2 on the optical axis, a thickness of the eyepiece lens group 3 on the optical axis, and an air conversion length on the optical axis from a most eye point-side lens surface of the objective lens group 2 to a most object-side lens surface of the eyepiece lens group 3 is AL, a conditional expression (1) is satisfied. The angular magnification M of the observation optical system 4 becomes an angular magnification of the finder 1. As a corresponding value of the conditional expression (1) is set to be not equal to or less than a lower limit, it becomes easy to sufficiently secure the angular magnification. As the corresponding value of the conditional expression (1) is set to be not equal to or greater than an upper limit, since the refractive power of the third lens Lb3 does not become too high, it is possible to suppress excessive correction of spherical aberration, and there is an advantage in reducing the size in the optical axis direction. In addition, in a case where a configuration satisfying a conditional expression (1-1) is made, it is possible to obtain more satisfactory characteristics.

$$0.01 < -(M/f3) \times AL < 0.16 \tag{1}$$

$$0.02 < -(M/f3) \times AL < 0.15 \tag{1-1}$$

In the finder 1, it is preferable that, in a case where a focal length of the second lens Lb2 is f2, a conditional expression (2) is satisfied regarding f2 and AL. As a corresponding value of the conditional expression (2) is set to be not equal to or less than a lower limit, since the refractive power of the second lens Lb2 does not become too low, it is possible to decrease the amount of movement of the second lens Lb2 per diopter adjustment amount, and there is an advantage in reducing the size. As the corresponding value of the conditional expression (2) is set to be not equal to or greater than an upper limit, since the refractive power of the second lens Lb2 does not become too high, it becomes easy to suppress fluctuation in aberration during diopter adjustment. In addition, in a case where a configuration satisfying a conditional expression (2-1) is made, it is possible to obtain more satisfactory characteristics.

$$1 < AL/f2 < 2 \tag{2}$$

$$1.2 < AL/f2 < 1.8 \tag{2-1}$$

In the finder 1, it is preferable that, in a case where a focal length of the eyepiece lens group is fP, and the focal length of the third lens Lb3 is f3, a conditional expression (3) is satisfied. As a corresponding value of the conditional expression (3) is set to be not equal to or less than a lower limit, since the refractive power of the eyepiece lens group 3 does not become too high, the angular magnification does not become too large, and there is an advantage in reducing the size in a radial direction. As the corresponding value of the conditional expression (3) is set to be not equal to or greater than an upper limit, since the refractive power of the third lens Lb3 does not become too high, it is possible to suppress excessive correction of spherical aberration. In addition, in a case where a configuration satisfying a conditional expression (3-1) is made, it is possible to obtain more satisfactory characteristics.

$$0.15 < -fP/f3 < 0.45 \tag{3}$$

$$0.2 < -fP/f3 < 0.4 \tag{3-1}$$

In the finder 1, it is preferable that, in a case where a refractive index of the third lens Lb3 with respect to d line is NdLb3, a conditional expression (4) is satisfied. As a corresponding value of the conditional expression (4) is to be not equal to or less than a lower limit, since it is possible to suppress a decrease in absolute value of a radius of curvature of the third lens Lb3, there is an advantage in reducing the size in the optical axis direction. As the corresponding value of the conditional expression (4) is set to be not equal to or greater than an upper limit, since the refractive power of the third lens Lb3 does not become too high, it is possible to suppress excessive correction of spherical aberration. In addition, in a case where a configuration satisfying a conditional expression (4-1) is made, it is possible to obtain more satisfactory characteristics.

$$1.48 < NdLb3 < 1.66 \tag{4}$$

$$1.5 < NdLb3 < 1.64 \tag{4-1}$$

In the finder 1, it is preferable that, in a case where a focal length of the objective lens group 2 is fN, and the focal length of the third lens Lb3 is f3, a conditional expression (5) is satisfied. As a corresponding value of the conditional expression (5) is set to be not equal to or less than a lower limit, since the refractive power of the objective lens group 2 does not become too high, it becomes easy to sufficiently secure the angular magnification. As the corresponding value of the conditional expression (5) is set to be not equal to or greater than an upper limit, since the refractive power of the third lens Lb3 does not become too high, it is possible to suppress excessive correction of spherical aberration. In addition, in a case where a configuration satisfying a conditional expression (5-1) is made, it is possible to obtain more satisfactory characteristics.

$$0.05 < fN/f3 < 0.25 \tag{5}$$

$$0.1 < fN/f3 < 0.2 \tag{5-1}$$

In the finder 1, in a configuration comprising the other optical system that is different from the observation optical system 4 outside the optical path of the observation optical system 4, and the optical path combination member 5 that combines the optical path of the other optical system and the optical path of the observation optical system 4 between the objective lens group 2 and the eyepiece lens group 3, it is preferable that, in a case where the focal length of the objective lens group 2 is fN, and a distance on the optical axis from a most object-side surface of the objective lens group 2 to a most object-side surface of the optical path combination member 5 is BL, a conditional expression (6) is satisfied. As a corresponding value of the conditional expression (6) is set to be not equal to or less than a lower limit, since the refractive power of the objective lens group 2 does not become too high, it becomes easy to sufficiently secure the angular magnification. As the corresponding value of the conditional expression (6) is set to be not equal to or greater than an upper limit, it is possible to suppress an increase in absolute value of a radius of curvature of a lens composing the objective lens group 2, and since the refractive power of the objective lens group 2 does not become too low, the angular magnification does not become too large, and there is an advantage in reducing the size of the objective lens group 2 in the radial direction. In addition, in a case where a configuration satisfying a conditional expression (6-1) is made, it is possible to obtain more satisfactory characteristics.

$$-5.5 < fN/BL < -1.5 \tag{6}$$

$$-5 < fN/BL < -2 \tag{6-1}$$

In FIG. 1, although an example where the optical path combination member 5 is the half prism has been described, the optical path combination member 5 is not limited thereto as long as the optical paths can be combined. The optical path combination member 5 may be a half mirror. In a case where the optical path combination member 5 includes a film that splits incident light into reflected light and transmitted light, a split ratio of reflected light and transmitted light may be other than 1:1.

The finder 1 can have a configuration in which the other optical system is omitted. In this case, the observation optical system 4 may consist of the objective lens group 2 and the eyepiece lens group 3. For simplification of the configuration, it is preferable that a lens group having a refractive power included in the observation optical system 4 consists of only the objective lens group 2 and the eyepiece lens group 3.

Although the eyepiece lens group 3 consists of the three lenses of the first lens Lb1 to the third lens Lb3, the objective lens group 2 may have a configuration different from the example of FIG. 1. For example, the objective lens group 2 may consist of one lens having a negative refractive power.

The above-described configurations and available configurations including the configurations relating to the conditional expressions may be any combination, and it is preferable that the configurations are suitably selectively employed according to required specification. According to the present disclosure, it is possible to implement a finder that achieves reduction in size and a high angular magnification and maintains satisfactory optical performance while having a diopter adjustment function. The term "high angular magnification" means an angular magnification equal to or greater than 0.5 times.

Next, examples of a finder of the present disclosure will be described. A finder of each of Examples 1 to 5 described below has the optical path combination member 5 disposed between the objective lens group 2 and the eyepiece lens group 3, and has an observation optical system and a display optical system.

Example 1

Figure 2:
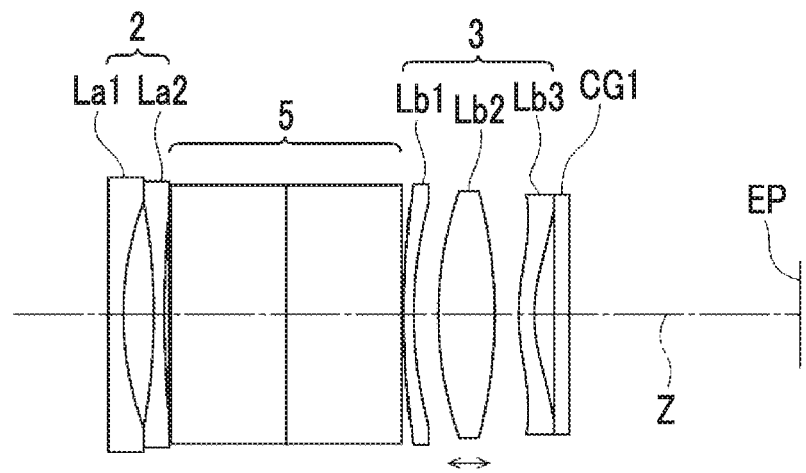
FIG. 2 is a cross-sectional view showing the configuration of an observation optical system of a finder of Example 1 of the present disclosure.
Figure 3:
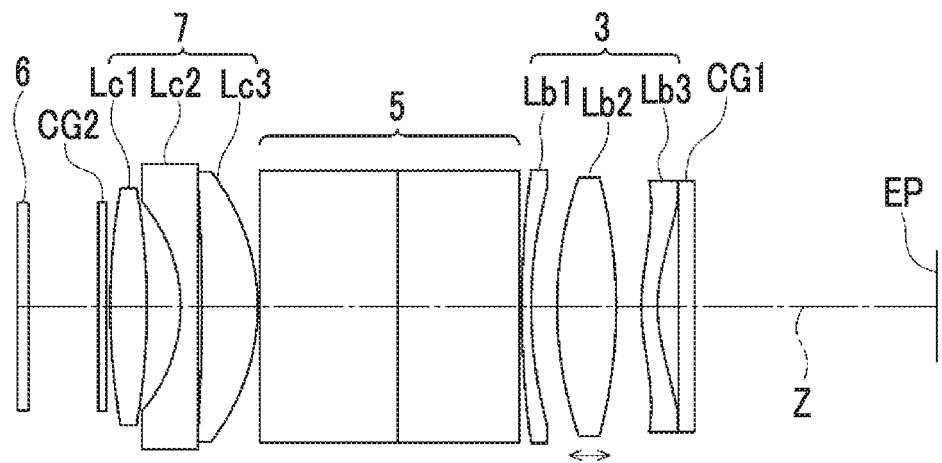
FIG. 3 is a cross-sectional view showing the configuration of a display optical system of the finder of Example 1 of the present disclosure.

In regard to the finder of Example 1, a cross-sectional configuration of the observation optical system is shown in FIG. 2, and a cross-sectional configuration of the display optical system is shown in FIG. 3. In FIGS. 2 and 3, the cover glass CG1 and the eye point EP are also shown. Although the optical path of the display optical system is a bent optical path as shown in FIG. 1, a drawing in which an optical path is not bent is shown in FIG. 3 for ease of understanding.

The observation optical system shown in FIG. 2 consists of, in order from the object side to the eye point side along the optical path, the objective lens group 2, the optical path combination member 5, and the eyepiece lens group 3. The objective lens group 2 consists of, in order from the object side to the eye point side, two lenses La1 and La2 having a negative refractive power. The eyepiece lens group 3 consists of, in order from the object side to the eye point side, the first lens Lb1 having a negative refractive power, the second lens Lb2 having a positive refractive power, and the third lens Lb3 having a negative refractive power. During diopter adjustment, only the second lens Lb2 moves along the optical axis Z. The above is the outline of the observation optical system of the finder of Example 1.

The display optical system shown in FIG. 3 consists of, in order from the display element side to the eye point side along the optical path, the display element 6, the cover glass CG2, the element-side lens group 7, the optical path combination member 5, and the eyepiece lens group 3. The element-side lens group 7 consists of, in order from the display element side, the lens Lc1 having a positive refractive power, the lens Lc2 having a negative refractive power, and the lens Lc3 having a positive refractive power. The above is the outline of the display optical system of the finder of Example 1.

In regard to the observation optical system of the finder of Example 1, basic lens data is shown in Table 1, variable surface distances are shown in Table 2, specifications are shown in Table 3, and aspheric coefficients are shown in Table 4. In Table 1, a column of Sn shows a surface number that sequentially increases one by one toward the eye point side from the most object-side surface as a first surface, a column of R shows a radius of curvature of each surface, and a column of D shows a surface distance on the optical axis between each surface and an adjacent surface on the eye point side. A column of Nd shows a refractive index of each component with respect to d line, and a column of vd shows an Abbe number of each component with respect to d line.

In Table 1, a sign of a radius of curvature of a surface convex toward the object side is positive, and a sign of a radius of curvature of a surface convex toward the eye point side is negative. The cover glass CG1 and the eye point EP are also shown in Table 1. In Table 1, the surface number and text reading (EP) are described in the column of the surface number of a surface corresponding to the eye point EP. Furthermore, in Table 1, the film inside the optical path combination member 5 is shown as one surface.

In Table 1, the variable surface distance during diopter adjustment is referenced by a symbol dd[ ], and is written in the column of D, where the surface number of the distance on the object side is noted in [ ]. Table 2 shows values of variable surface distances for each diopter. In Table 2, dpt means a diopter. Table 3 shows an angular magnification of the observation optical system and an apparent field of view. The unit of the apparent field of view in Table 3 is degree.

In Table 1, a mark * is attached to the surface number of an aspheric surface, and a numerical value of a paraxial radius of curvature is written in the column of the radius of curvature of an aspheric surface. In Table 4, a column of Sn shows the surface number of the aspheric surface, and columns of KA and Am show numerical values of aspheric coefficients of each aspheric surface. Note that m is an integer equal to or greater than 3 and differs depending on the surfaces. For example, in the aspheric surfaces of Example 1, m=4, 6, 8, . . . , and 20, "E±n" (n: integer) in the numerical values of the aspheric coefficients in Table 4 means "×10$^{±n}$". KA and Am are the aspheric coefficients represented by an aspheric surface expression described below.

$$Zd = C \times h^2 / \{1 + (1 - KA \times C^2 \times h^2)^{1/2}\} + \Sigma Am \times h^m$$

Here, Zd: an aspheric surface depth (a length of a vertical line from a point on an aspheric surface at height h to a plane that is perpendicular to the optical axis and in contact with an aspheric surface apex), h: a height (a distance from the optical axis to the lens surface), C: a reciprocal of a paraxial radius of curvature, KA, Am: aspheric coefficients, and Σ in the aspheric surface expression means the sum with respect to m.

In data of the tables, although degree is used as a unit of an angle and mm (millimeter) is used as a unit of a length, other appropriate units may be used since optical systems are usable even though the optical systems are proportionally magnified or proportionally reduced. In the following tables, numerical values are rounded to a predetermined digit.

TABLE 1

Example 1: Observation Optical System

| Sn | R | D | Nd | vd |
|---|---|---|---|---|
| 1 | ∞ | 1.0000 | 1.90070 | 37.05 |
| 2 | 22.5571 | 1.9700 | | |
| 3 | −44.2603 | 0.7000 | 1.88300 | 39.22 |
| 4 | 88.0655 | 0.4000 | | |
| 5 | ∞ | 7.5000 | 1.79952 | 42.22 |
| 6 | ∞ | 7.5000 | 1.79952 | 42.22 |
| 7 | ∞ | 0.1500 | | |
| 8 | 67.3216 | 0.5800 | 1.98613 | 16.48 |
| 9 | 29.2180 | dd [9] | | |
| 10 | 25.7876 | 3.6600 | 1.95375 | 32.32 |
| 11 | −33.3649 | dd [11] | | |
| *12 | 14.3772 | 1.0000 | 1.53389 | 55.98 |
| *13 | 10.4930 | 1.3000 | | |
| 14 | ∞ | 1.0000 | 1.49100 | 57.58 |
| 15 | ∞ | 15.0000 | | |
| 16(EP) | ∞ | | | |

TABLE 2

Example 1: Observation Optical System

| Diopter | +2 dpt | −1 dpt | −4 dpt |
|---|---|---|---|
| dd [9] | 2.7580 | 1.6000 | 0.4420 |
| dd [11] | 0.4020 | 1.5600 | 2.7180 |

TABLE 3

Example 1: Observation Optical System

| | |
|---|---|
| Angular Magnification | 0.516 |
| Apparent Field of View | 31.6 |

TABLE 4

Example 1: Observation Optical System

| Sn | 12 | 13 |
|---|---|---|
| KA | 1.0000000E+00 | 1.0000000E+00 |
| A4 | −4.8949584E−04 | −5.0189826E−04 |
| A6 | −1.5767401E−05 | −2.5396500E−05 |
| A8 | 8.7483941E−07 | 1.4136820E−06 |
| A10 | −1.9593181E−08 | −2.7436206E−08 |
| A12 | 1.9633465E−10 | −2.0846641E−10 |
| A14 | −1.2145846E−12 | 1.9220810E−11 |
| A16 | 4.0950783E−14 | −3.3544294E−13 |
| A18 | −8.2205764E−16 | 2.3195722E−15 |
| A20 | 4.9128065E−18 | −4.7719756E−18 |

Similarly, in regard to the display optical system of the finder of Example 1, basic lens data is shown in Table 5, variable surface distances are shown in Table 6, and aspheric coefficients are shown in Table 7. In Table 5, a surface number is attached to a surface of a component, where the surface number sequentially increases one by one toward the eye point side in a case where a surface of the display element 6 opposite to the optical path combination member 5 is regarded as a first surface. The cover glass CG1 and the eye point EP are also shown.

TABLE 5

Example 1: Display Optical System

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.2400 | | |
| 5 | 44.3373 | 2.2800 | 2.00100 | 29.13 |
| 6 | −44.3373 | 2.0900 | | |
| 7 | −10.4733 | 1.0700 | 1.98613 | 16.48 |
| 8 | ∞ | 0.2500 | | |
| 9 | −125.2258 | 3.4400 | 1.90525 | 35.04 |
| 10 | −14.2661 | 0.1400 | | |
| 11 | ∞ | 8.5000 | 1.79952 | 42.22 |
| 12 | ∞ | 7.5000 | 1.79952 | 42.22 |
| 13 | ∞ | 0.1500 | | |
| 14 | 67.3216 | 0.5800 | 1.98613 | 16.48 |
| 15 | 29.2180 | dd [15] | | |
| 16 | 25.7876 | 3.6600 | 1.95375 | 32.32 |
| 17 | −33.3649 | dd [17] | | |
| *18 | 14.3772 | 1.0000 | 1.53389 | 55.98 |
| *19 | 10.4930 | 1.3000 | | |
| 20 | ∞ | 1.0000 | 1.49100 | 57.58 |
| 21 | ∞ | 15.0000 | | |

TABLE 5-continued

Example 1: Display Optical System

| Sn | R | D | Nd | vd |
|---|---|---|---|---|
| 22 (EP) | ∞ | | | |

TABLE 6

Example 1: Display Optical System

| Diopter | +2 dpt | −1 dpt | −4 dpt |
|---|---|---|---|
| dd[15] | 2.7580 | 1.6000 | 0.4420 |
| dd[17] | 0.4020 | 1.5600 | 2.7180 |

TABLE 7

Example 1: Display Optical System

| Sn | 18 | 19 |
|---|---|---|
| KA | 1.0000000E+00 | 1.0000000E+00 |
| A4 | −4.8949584E−04 | −5.0189826E−04 |
| A6 | −1.5767401E−05 | −2.5396500E−05 |
| A8 | 8.7483941E−07 | 1.4136820E−06 |
| A10 | −1.9593181E−08 | −2.7436206E−08 |
| A12 | 1.9633465E−10 | −2.0846641E−10 |
| A14 | −1.2145846E−12 | 1.9220810E−11 |
| A16 | 4.0950783E−14 | −3.3544294E−13 |
| A18 | −8.2205764E−16 | 2.3195722E−15 |
| A20 | 4.9128065E−18 | −4.7719756E−18 |

Figure 12:
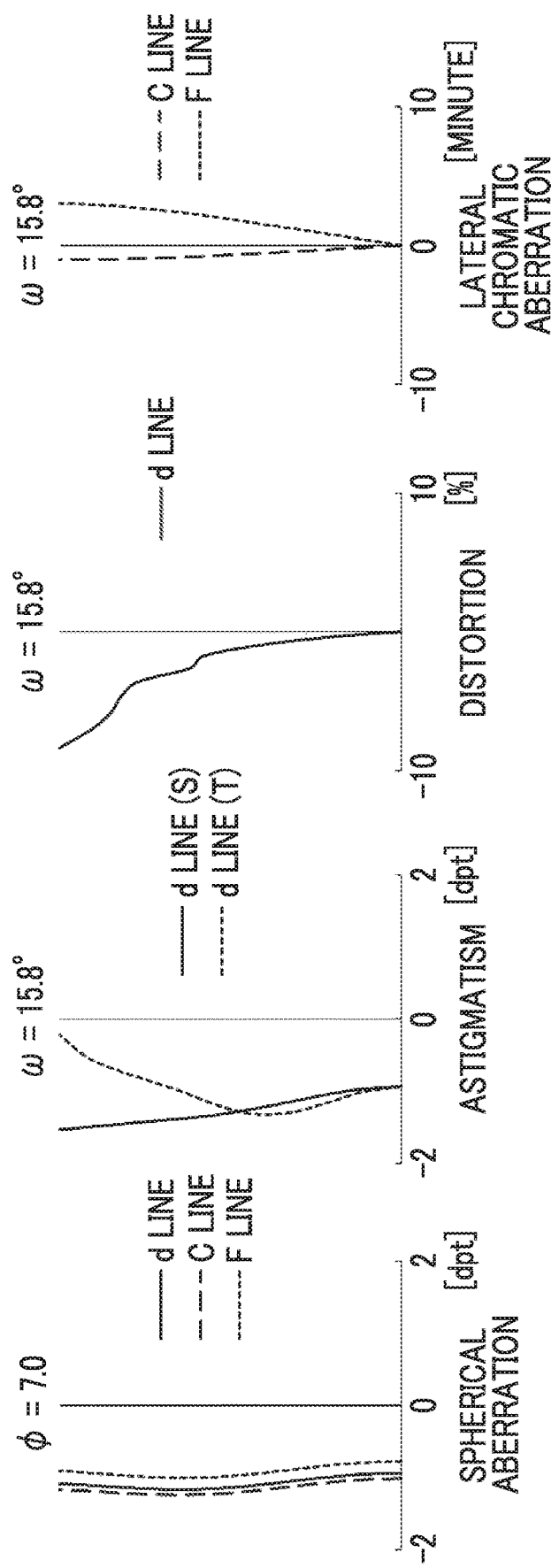
FIG. 12 shows respective aberration diagrams of the observation optical system of the finder of Example 1 of the present disclosure.

FIG. 12 shows respective aberration diagrams of the observation optical system of Example 1 in a state in which the diopter is −1. In FIG. 12, in order from the left side, spherical aberration, astigmatism, distortion, and lateral chromatic aberration are shown. In the spherical aberration diagram, aberrations with respect to d line, C line, and F line are shown by a solid line, a long dashed line, and a short dashed line, respectively. In the astigmatism diagram, an aberration in a sagittal direction with respect to d line is shown by a solid line, and an aberration in a tangential direction with respect to d line is shown by a short dashed line. In the distortion diagram, an aberration with respect to d line is shown by a solid line. In the lateral chromatic aberration diagram, aberrations with respect to C line and F line are shown by a long dashed line and a short dashed line, respectively. φ=8.0 in the spherical aberration diagram means that a diameter of an eye point is 8.0 mm, and ω in other aberration diagrams means a half angle of view of an apparent field of view. A unit of a horizontal axis in the spherical aberration diagram and the astigmatism diagram is diopter, and a unit of a horizontal axis in the lateral chromatic aberration diagram is minute of angle.

The symbols, the meanings, the description methods, and the illustration methods of respective data relating to Example 1 are the same as those in the following examples unless otherwise specified, and thus, hereinafter, overlapping description will not be repeated.

Example 2

Figure 4:
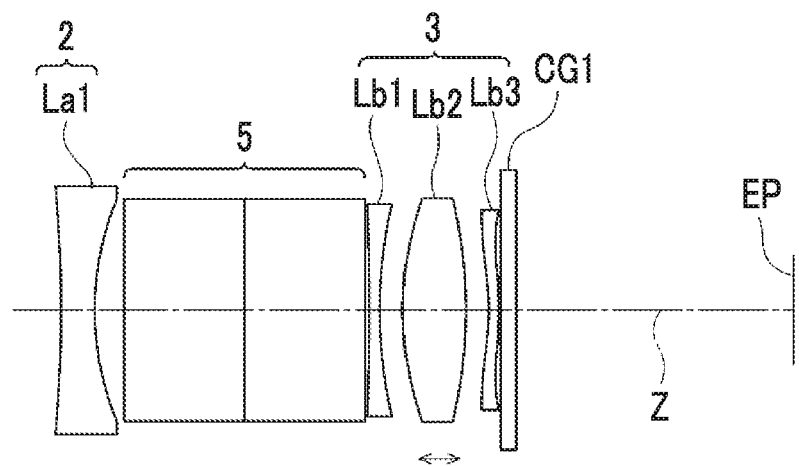
FIG. 4 is a cross-sectional view showing the configuration of an observation optical system of a finder of Example 2 of the present disclosure.
Figure 5:
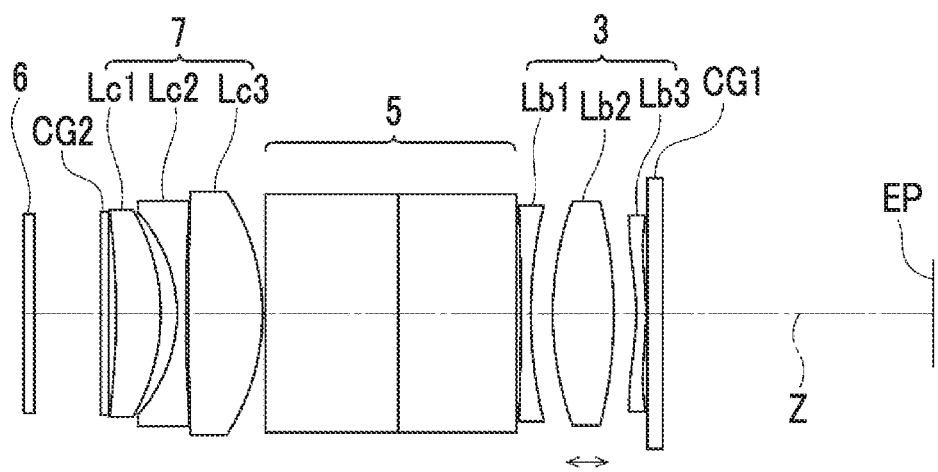
FIG. 5 is a cross-sectional view showing the configuration of a display optical system of the finder of Example 2 of the present disclosure.
Figure 13:
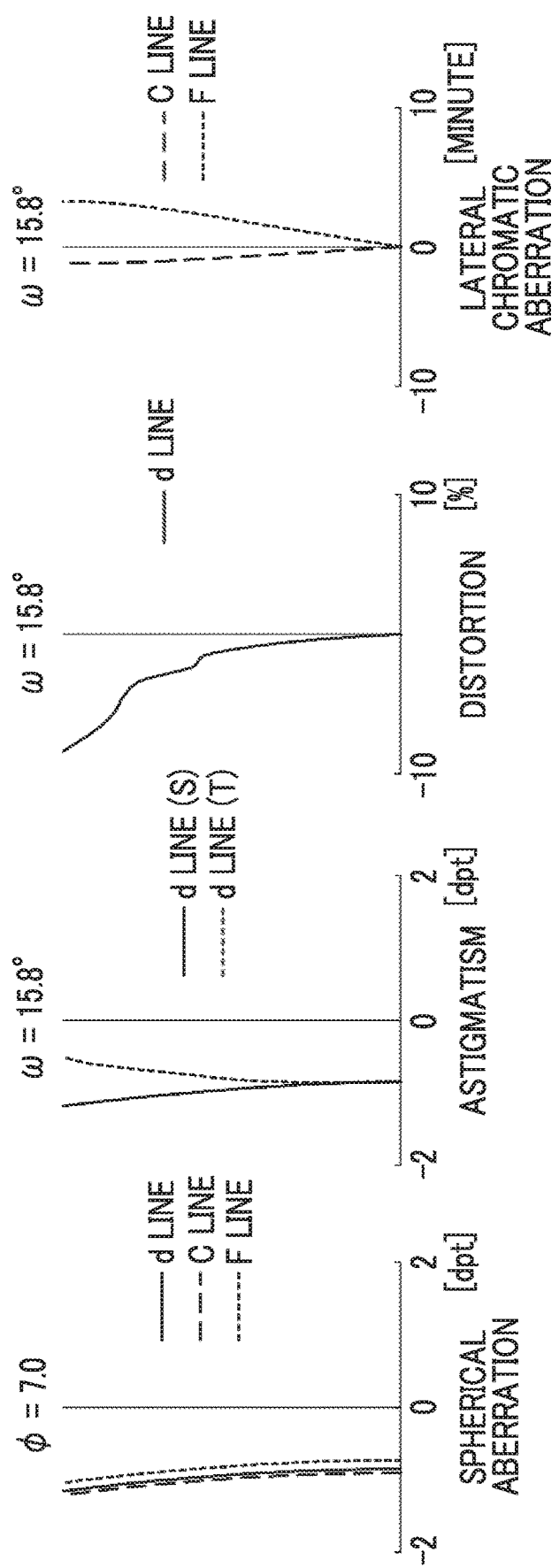
FIG. 13 shows respective aberration diagrams of the observation optical system of the finder of Example 2 of the present disclosure.

In regard to the finder of Example 2, a cross-sectional configuration of the observation optical system is shown in FIG. 4, a cross-sectional configuration of the display optical system is shown in FIG. 5, and respective aberration diagrams of the observation optical system in a state in which a diopter is −1 are shown in FIG. 13. The observation optical system of the finder of Example 2 has the same configuration as the outline of the observation optical system of the finder of Example 1, except that the objective lens group 2 of the observation optical system consists of only one lens Lal having a negative refractive power. The display optical system of the finder of Example 2 has the same configuration as the outline of the display optical system of the finder of Example 1. In regard to the observation optical system of the finder of Example 2, basic lens data is shown in Table 8, variable surface distances are shown in Table 9, specifications are shown in Table 10, and aspheric coefficients are shown in Table 11. In regard to the display optical system of the finder of Example 2, basic lens data is shown in Table 12, variable surface distances are shown in Table 13, and aspheric coefficients are shown in Table 14.

TABLE 8

Example 2: Observation Optical System

| Sn | R | D | Nd | vd |
|---|---|---|---|---|
| 1 | −91.4232 | 2.1289 | 1.90070 | 37.05 |
| 2 | 19.2288 | 1.8416 | | |
| 3 | ∞ | 7.5920 | 1.70155 | 41.14 |
| 4 | ∞ | 7.5920 | 1.70155 | 41.14 |
| 5 | ∞ | 0.2730 | | |
| 6 | −252.4175 | 0.6561 | 1.90070 | 37.05 |
| 7 | 30.5503 | dd[7] | | |
| 8 | 22.2186 | 3.9568 | 1.90070 | 37.05 |
| 9 | −30.9248 | dd[9] | | |
| *10 | −15.4336 | 0.6365 | 1.63351 | 23.63 |
| *11 | −20.6954 | 0.1071 | | |
| 12 | ∞ | 1.0000 | 1.51680 | 64.20 |
| 13 | ∞ | 17.5000 | | |
| 14(EP) | ∞ | | | |

TABLE 9

Example 2: Observation Optical System

| Diopter | +2 dpt | −1 dpt | −4 dpt |
|---|---|---|---|
| dd[7] | 2.4537 | 1.4254 | 0.3971 |
| dd[9] | 0.4146 | 1.4429 | 2.4712 |

TABLE 10

Example 2: Observation Optical System

| Angular Magnification | 0.511 |
|---|---|
| Apparent Field of View | 31.56 |

TABLE 11

Example 2: Observation Optical System

| Sn | 10 | 11 |
|---|---|---|
| KA | 1.0000000E+00 | 1.0000000E+00 |
| A4 | 8.3765640E−04 | 8.2798383E−04 |
| A6 | −8.8730427E−06 | −7.3546377E−06 |
| A8 | 5.7447627E−08 | 4.0704856E−08 |
| A10 | −2.4177783E−10 | −1.7208960E−10 |

TABLE 12

Example 2: Display Optical System

| Sn | R | D | Nd | vd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| 5 | −52.6588 | 2.8807 | 2.00100 | 29.13 |
| 6 | −14.0666 | 1.0538 | | |
| 7 | −10.1666 | 0.5586 | 1.95906 | 17.47 |
| 8 | 104.1638 | 0.1987 | | |
| 9 | 315.4051 | 4.7779 | 1.95375 | 32.31 |
| 10 | −15.2103 | 0.1977 | | |
| 11 | ∞ | 8.5920 | 1.70155 | 41.14 |
| 12 | ∞ | 7.5920 | 1.70155 | 41.14 |
| 13 | ∞ | 0.2730 | | |
| 14 | −252.4175 | 0.6561 | 1.90070 | 37.05 |
| 15 | 30.5503 | dd[15] | | |
| 16 | 22.2186 | 3.9568 | 1.90070 | 37.05 |
| 17 | −30.9248 | dd[17] | | |
| *18 | −15.4336 | 0.6365 | 1.63351 | 23.63 |
| *19 | −20.6954 | 0.1071 | | |
| 20 | ∞ | 1.0000 | 1.51680 | 64.20 |
| 21 | ∞ | 17.5000 | | |
| 22(EP) | ∞ | | | |

TABLE 13

Example 2: Display Optical System

| Diopter | +2 dpt | −1 dpt | −4 dpt |
|---|---|---|---|
| dd[15] | 2.4537 | 1.4254 | 0.3971 |
| dd[17] | 0.4146 | 1.4429 | 2.4712 |

TABLE 14

Example 2: Display Optical System

| Sn | 18 | 19 |
|---|---|---|
| KA | 1.0000000E+00 | 1.0000000E+00 |
| A4 | 8.3765640E−04 | 8.2798383E−04 |
| A6 | −8.8730427E−06 | −7.3546377E−06 |
| A8 | 5.7447627E−08 | 4.0704856E−08 |
| A10 | −2.4177783E−10 | −1.7208960E−10 |

Example 3

Figure 6:
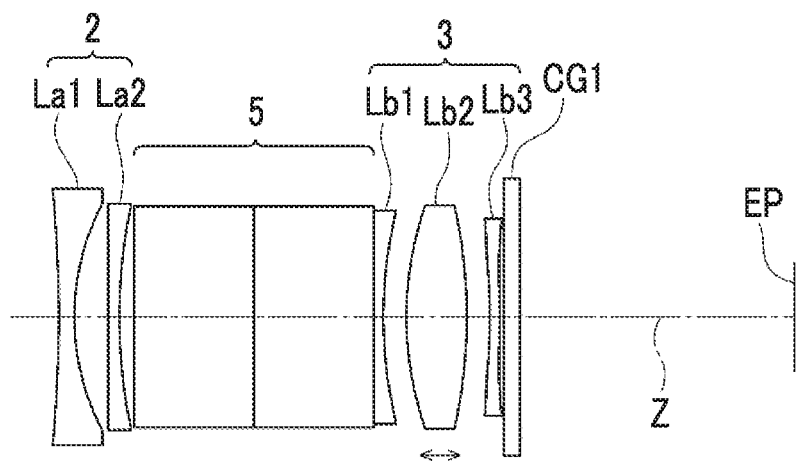
FIG. 6 is a cross-sectional view showing the configuration of an observation optical system of a finder of Example 3 of the present disclosure.
Figure 7:
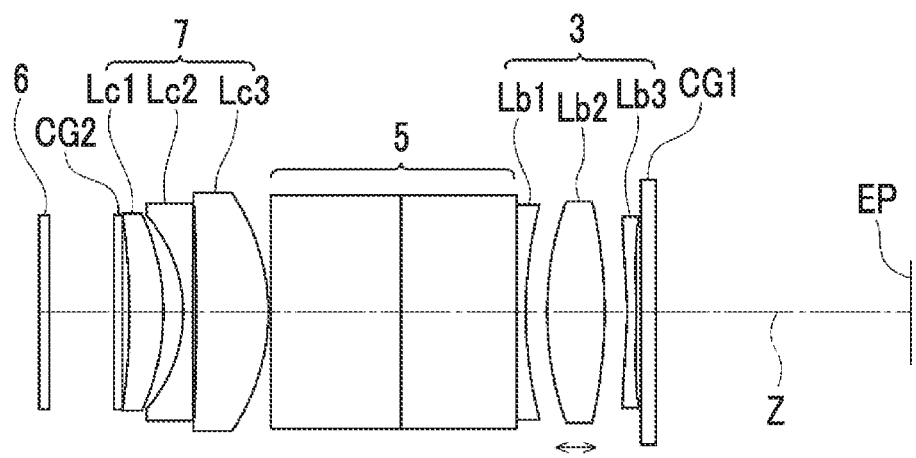
FIG. 7 is a cross-sectional view showing the configuration of a display optical system of the finder of Example 3 of the present disclosure.
Figure 14:
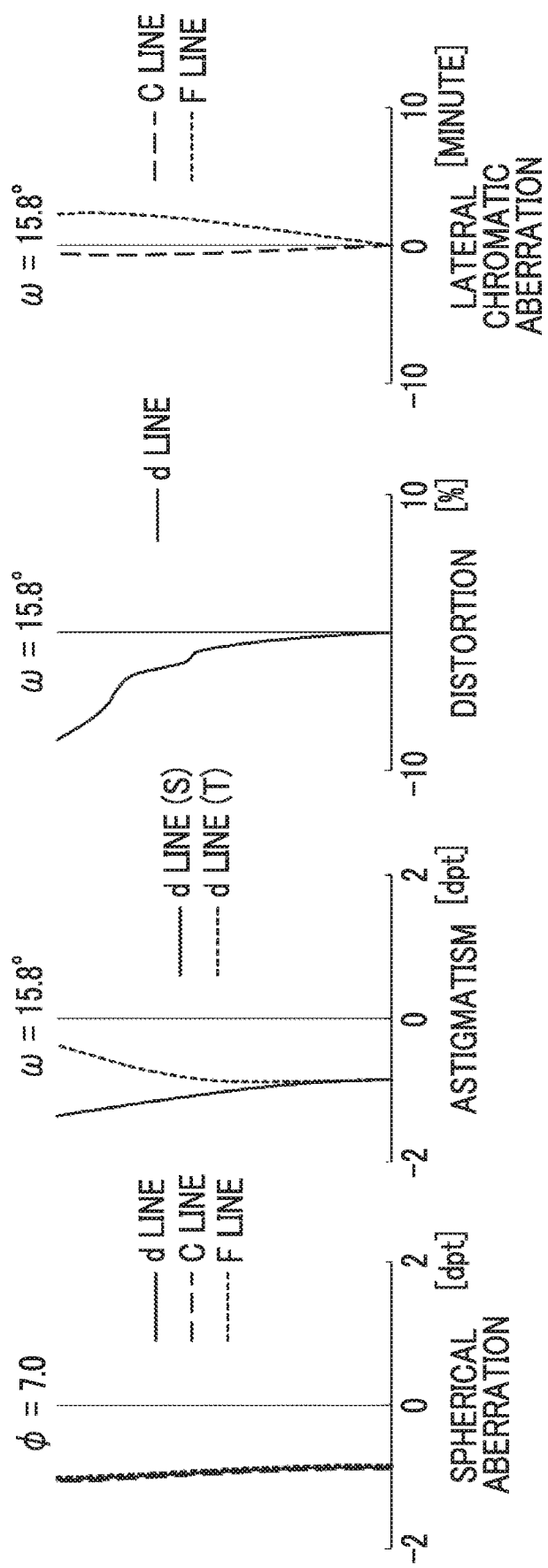
FIG. 14 shows respective aberration diagrams of the observation optical system of the finder of Example 3 of the present disclosure.

In regard to the finder of Example 3, a cross-sectional configuration of the observation optical system is shown in FIG. 6, a cross-sectional configuration of the display optical system is shown in FIG. 7, and respective aberration diagrams of the observation optical system in a state in which a diopter is −1 are shown in FIG. 14. The finder of Example 3 has the same configuration as the outline of each of the observation optical system and the display optical system of the finder of Example 1. In regard to the observation optical system of the finder of Example 3, basic lens data is shown in Table 15, variable surface distances are shown in Table 16, specifications are shown in Table 17, and aspheric coefficients are shown in Table 18. In regard to the display optical system of the finder of Example 3, basic lens data is shown in Table 19, variable surface distances are shown in Table 20, and aspheric coefficients are shown in Table 21.

TABLE 15

Example 3: Observation Optical System

| Sn | R | D | Nd | νd |
|---|---|---|---|---|
| 1 | −91.4527 | 1.0000 | 1.51680 | 64.20 |
| 2 | 16.2415 | 2.1653 | | |
| 3 | −9394.8803 | 0.7000 | 1.74100 | 52.64 |
| 4 | 36.0206 | 0.9365 | | |
| 5 | ∞ | 7.6344 | 1.70155 | 41.14 |
| 6 | ∞ | 7.6344 | 1.70155 | 41.14 |
| 7 | ∞ | 0.0187 | | |
| 8 | −228581.9080 | 0.5989 | 1.89286 | 20.36 |
| 9 | 29.7673 | dd[9] | | |
| 10 | 22.7240 | 3.8345 | 1.95375 | 32.32 |
| 11 | −34.4243 | dd[11] | | |
| *12 | −29.4205 | 0.6153 | 1.63351 | 23.63 |
| *13 | 64.5050 | 0.3048 | | |
| 14 | ∞ | 1.0000 | 1.51680 | 64.20 |
| 15 | ∞ | 17.5000 | | |
| 16(EP) | ∞ | | | |

TABLE 16

Example 3: Observation Optical System

| Diopter | +2 dpt | −1 dpt | −4 dpt |
|---|---|---|---|
| dd[9] | 2.4685 | 1.4061 | 0.3438 |
| dd[11] | 0.4089 | 1.4713 | 2.5336 |

TABLE 17

Example 3: Observation Optical System

| | |
|---|---|
| Angular Magnification | 0.508 |
| Apparent Field of View | 31.52 |

TABLE 18

Example 3: Observation Optical System

| Sn | 12 | 13 |
|---|---|---|
| KA | 1.0000000E+00 | 1.0000000E+00 |
| A4 | 4.5639921E−04 | 4.8784631E−04 |
| A6 | −6.9757365E−06 | −6.3970454E−06 |
| A8 | 4.7475882E−08 | 3.1930770E−08 |
| A10 | −1.1088672E−10 | 5.5230300E−11 |

TABLE 19

Example 3: Display Optical System

| Sn | R | D | Nd | νd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| 5 | −49.7314 | 2.2587 | 2.00331 | 28.32 |
| 6 | −16.3584 | 1.3216 | | |
| 7 | −10.0754 | 0.6220 | 1.95906 | 17.47 |
| 8 | 429.0942 | 0.2438 | | |
| 9 | −188.4677 | 4.7948 | 2.00331 | 28.32 |
| 10 | −14.7478 | 0.1768 | | |
| 11 | ∞ | 8.6344 | 1.70155 | 41.14 |
| 12 | ∞ | 7.6344 | 1.70155 | 41.14 |
| 13 | ∞ | 0.0187 | | |
| 14 | −228581.9080 | 0.5989 | 1.89286 | 20.36 |
| 15 | 29.7673 | dd[15] | | |
| 16 | 22.7240 | 3.8345 | 1.95375 | 32.32 |
| 17 | −34.4243 | dd[17] | | |
| *18 | −29.4205 | 0.6153 | 1.63351 | 23.63 |
| *19 | −64.5050 | 0.3048 | | |
| 20 | ∞ | 1.0000 | 1.51680 | 64.20 |
| 21 | ∞ | 17.0000 | | |
| 22(EP) | ∞ | | | |

TABLE 20

Example 3: Display Optical System

| Diopter | +2 dpt | −1 dpt | −4 dpt |
|---|---|---|---|
| dd[15] | 2.4685 | 1.4061 | 0.3438 |
| dd[17] | 0.4089 | 1.4713 | 2.5336 |

TABLE 21

Example 3: Display Optical System

| Sn | 18 | 19 |
|---|---|---|
| KA | 1.0000000E+00 | 1.0000000E+00 |
| A4 | 4.5639921E−04 | 4.8784631E−04 |
| A6 | −6.9757365E−06 | −6.3970454E−06 |
| A8 | 4.7475882E−08 | 3.1930770E−08 |
| A10 | −1.1088672E−10 | 5.5230300E−11 |

Example 4

Figure 8:
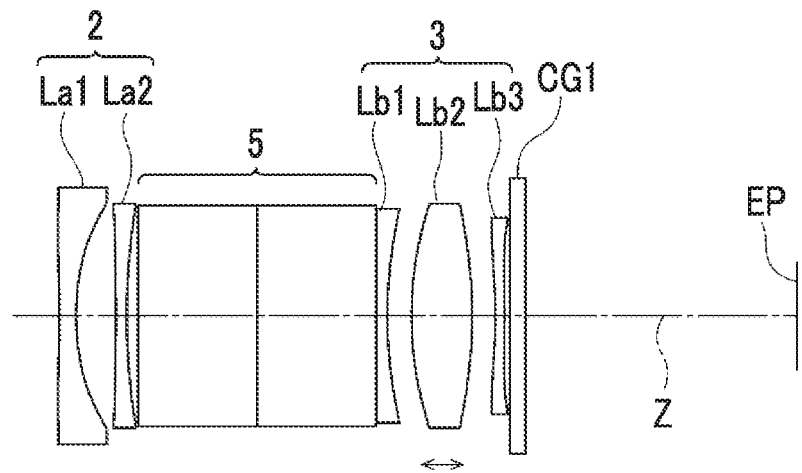
FIG. 8 is a cross-sectional view showing the configuration of an observation optical system of a finder of Example 4 of the present disclosure.
Figure 9:
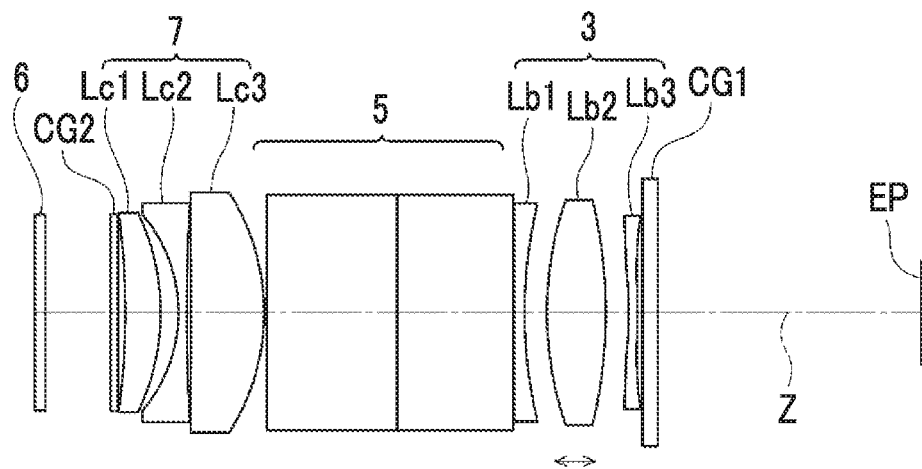
FIG. 9 is a cross-sectional view showing the configuration of a display optical system of the finder of Example 4 of the present disclosure.
Figure 15:
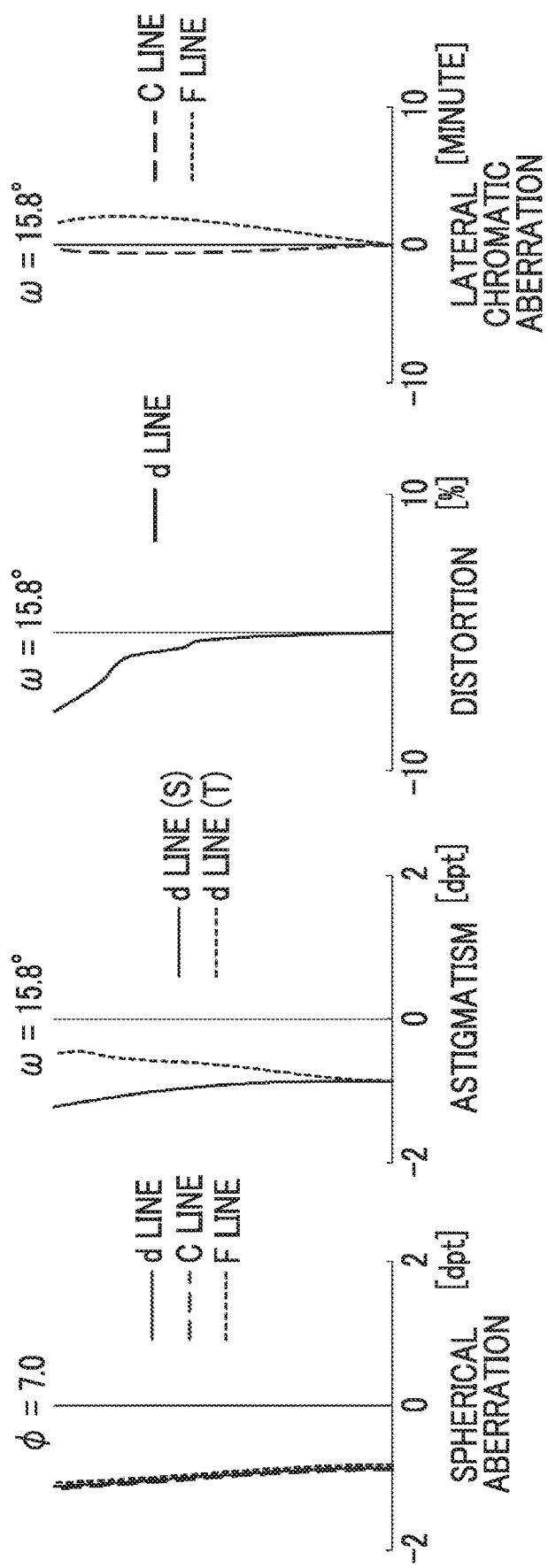
FIG. 15 shows respective aberration diagrams of the observation optical system of the finder of Example 4 of the present disclosure.

In regard to the finder of Example 4, a cross-sectional configuration of the observation optical system is shown in FIG. 8, a cross-sectional configuration of the display optical system is shown in FIG. 9, and respective aberration diagrams of the observation optical system in a state in which a diopter is −1 are shown in FIG. 15. The finder of the Example 4 has the same configuration as the outline of each of the observation optical system and the display optical system of the finder of Example 1. In regard to the observation optical system of the finder of Example 4, basic lens data is shown in Table 22, variable surface distances are shown in Table 23, specifications are shown in Table 24, and aspheric coefficients are shown in Table 25. In regard to the display optical system of the finder of Example 4, basic lens data is shown in Table 26, variable surface distances are shown in Table 27, and aspheric coefficients are shown in Table 28.

TABLE 22

Example 4: Observation Optical System

| Sn | R | D | Nd | νd |
|---|---|---|---|---|
| *1 | −91.4527 | 1.0875 | 1.56006 | 62.69 |
| *2 | 17.2182 | 2.5621 | | |
| 3 | −183.5815 | 0.7000 | 1.76882 | 51.12 |
| 4 | 45.9096 | 0.7364 | | |
| 5 | ∞ | 7.6450 | 1.70155 | 41.14 |
| 6 | ∞ | 7.6450 | 1.70155 | 41.14 |
| 7 | ∞ | 0.0687 | | |
| 8 | −4622.8800 | 0.6916 | 1.89286 | 20.36 |
| 9 | 31.7097 | dd[9] | | |
| 10 | 23.6366 | 3.9060 | 1.95375 | 32.32 |

TABLE 22-continued

Example 4: Observation Optical System

| Sn | R | D | Nd | vd |
|---|---|---|---|---|
| 11 | −33.4635 | dd[11] | | |
| *12 | −28.3764 | 0.5699 | 1.63351 | 23.63 |
| *13 | −62.9653 | 0.3658 | | |
| 14 | ∞ | 1.0000 | 1.51680 | 64.20 |
| 15 | ∞ | 17.5000 | | |
| 16(EP) | ∞ | | | |

TABLE 23

Example 4: Observation Optical System

| Diopter | +2 dpt | −1 dpt | −4 dpt |
|---|---|---|---|
| dd[9] | 2.5979 | 1.4810 | 0.3642 |
| dd[11] | 0.3903 | 1.5072 | 2.6241 |

TABLE 24

Example 4: Observation Optical System

| Angular Magnification | 0.497 |
|---|---|
| Apparent Field of View | 31.56 |

TABLE 25

Example 4: Observation Optical System

| Sn | 1 | 2 |
|---|---|---|
| KA | 1.0000000E+00 | 1.0000000E+00 |
| A3 | 0.0000000E+00 | 0.0000000E+00 |
| A4 | 1.2781213E−04 | 1.0896181E−04 |
| A5 | 3.3916325E−08 | 3.1020704E−08 |
| A6 | −6.8188710E−07 | 6.3505929E−07 |
| A7 | 1.5180126E−09 | −3.8006352E−09 |
| A8 | −2.5461082E−09 | −3.0763775E−09 |
| A9 | 7.1843071E−14 | −1.3512862E−11 |
| A10 | 3.1332920E−12 | −1.8008269E−10 |
| A11 | −9.2571812E−14 | 2.7227488E−13 |
| A12 | 7.7601042E−15 | 3.0994857E−14 |
| A13 | 2.4166066E−16 | 8.3946662E−15 |
| A14 | 2.8597582E−16 | −1.0730875E−15 |
| A15 | 3.2632909E−17 | 1.1024037E−16 |
| A16 | −4.6134365E−19 | −4.2926324E−17 |
| A17 | 2.6595365E−19 | 2.3304409E−19 |
| A18 | 1.9917991E−20 | 1.7317258E−19 |
| A19 | 1.4513030E−21 | 1.1068164E−21 |
| A20 | −9.2859072E−22 | 1.3117029E−20 |

| Sn | 12 | 13 |
|---|---|---|
| KA | 1.0000000E+00 | 1.0000000E+00 |
| A4 | 4.8899136E−04 | 5.2724740E−04 |
| A6 | −6.7717564E−06 | −6.6372869E−06 |
| A8 | 4.7236905E−08 | 4.6529961E−08 |
| A10 | −1.4832593E−10 | −1.2235504E−10 |

TABLE 26

Example 4: Display Optical System

| Sn | R | D | Nd | vvd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |

TABLE 26-continued

Example 4: Display Optical System

| Sn | R | D | Nd | vvd |
|---|---|---|---|---|
| 5 | −51.0280 | 2.3335 | 2.00331 | 28.32 |
| 6 | −15.8820 | 1.1874 | | |
| 7 | −10.3339 | 0.5311 | 1.95906 | 17.47 |
| 8 | 120.4839 | 0.2946 | | |
| 9 | −1408.5216 | 4.8587 | 2.00331 | 28.32 |
| 10 | −15.3145 | 0.1700 | | |
| 11 | ∞ | 8.6450 | 1.70155 | 41.14 |
| 12 | ∞ | 7.6450 | 1.70155 | 41.14 |
| 13 | ∞ | 0.0687 | | |
| 14 | −4622.8800 | 0.6916 | 1.89286 | 20.36 |
| 15 | 31.7097 | dd[15] | | |
| 16 | 23.6366 | 3.9060 | 1.95375 | 32.32 |
| 17 | −33.4635 | dd[17] | | |
| *18 | −28.3764 | 0.5699 | 1.63351 | 23.63 |
| *19 | −62.9653 | 0.3658 | | |
| 20 | ∞ | 1.0000 | 1.51680 | 64.20 |
| 21 | ∞ | 17.5000 | | |
| 22(EP) | ∞ | | | |

TABLE 27

Example 4: Display Optical System

| Diopter | +2 dpt | −1 dpt | −4 dpt |
|---|---|---|---|
| dd[15] | 2.5979 | 1.4810 | 0.3642 |
| dd[17] | 0.3903 | 1.5072 | 2.6241 |

TABLE 28

Example 4: Display Optical System

| Sn | 18 | 19 |
|---|---|---|
| KA | 1.0000000E+00 | 1.0000000E+00 |
| A4 | 4.8899136E−04 | 5.2724740E−04 |
| A6 | −6.7717564E−06 | −6.6372869E−06 |
| A8 | 4.7236905E−08 | 4.6529961E−08 |
| A10 | −1.4832593E−10 | −1.2235504E−10 |

Example 5

Figure 10:
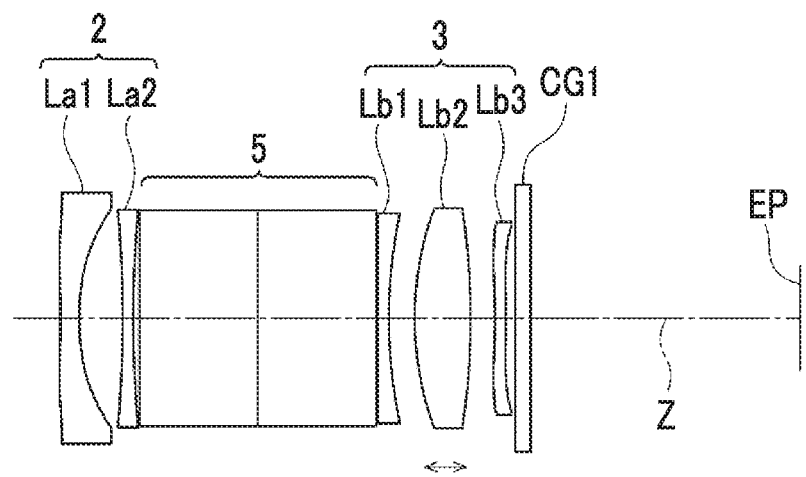
FIG. 10 is a cross-sectional view showing the configuration of an observation optical system of a finder of Example 5 of the present disclosure.
Figure 11:
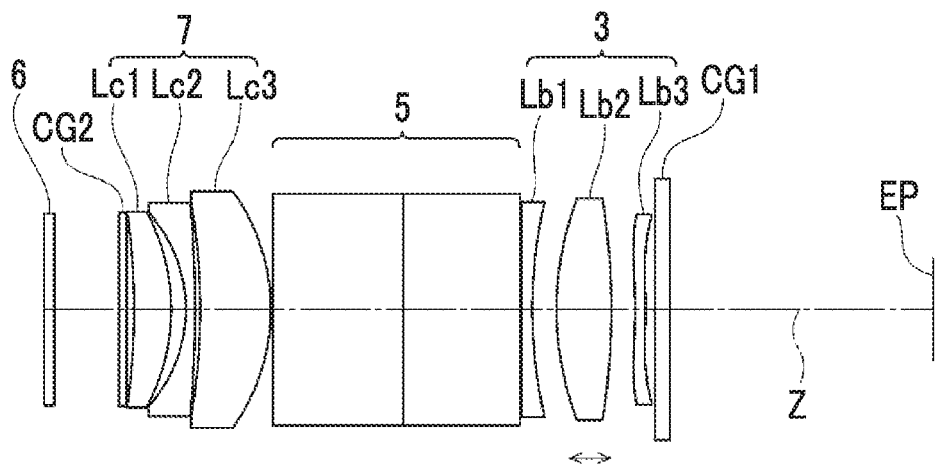
FIG. 11 is a cross-sectional view showing the configuration of a display optical system of the finder of Example 5 of the present disclosure.
Figure 16:
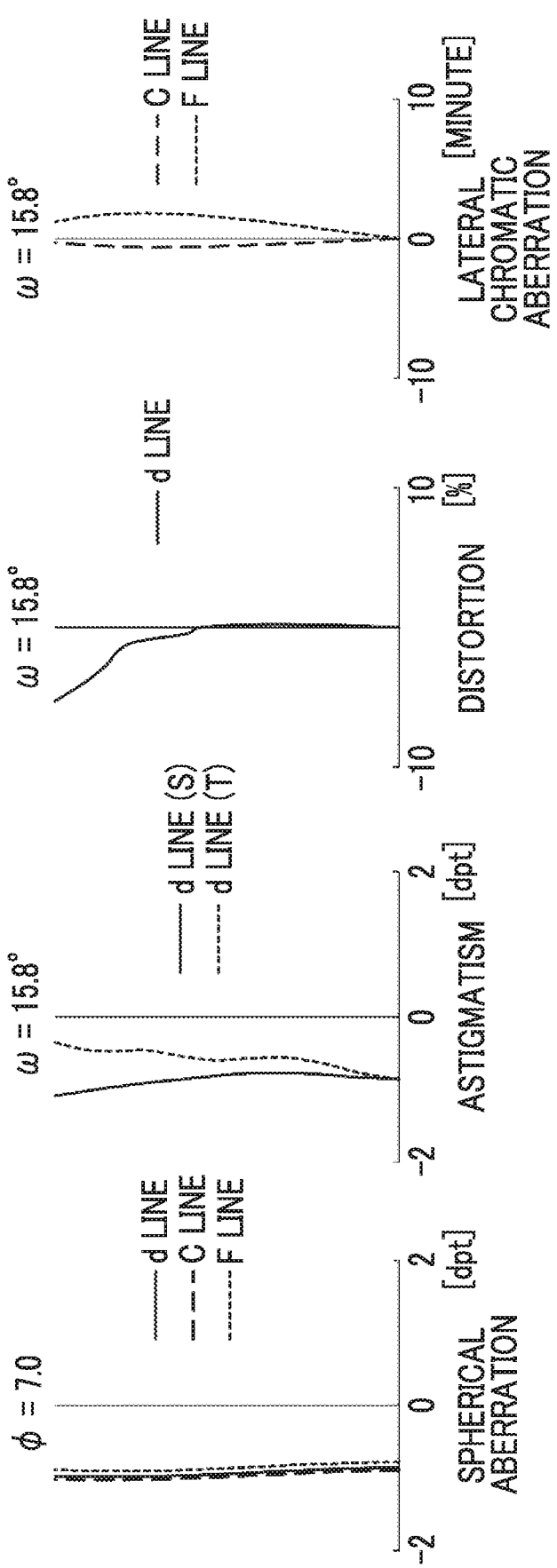
FIG. 16 shows respective aberration diagrams of the observation optical system of the finder of Example 5 of the present disclosure.

In regard to the finder of Example 5, a cross-sectional configuration of the observation optical system is shown in FIG. 10, a cross-sectional configuration of the display optical system is shown in FIG. 11, and respective aberration diagrams of the observation optical system in a state in which a diopter is −1 are shown in FIG. 16. The finder of Example 5 has the same configuration as the outline of each of the observation optical system and the display optical system of the finder of Example 1. In regard to the observation optical system of the finder of Example 5, basic lens data is shown in Table 29, variable surface distances are shown in Table 30, specifications are shown in Table 31, and aspheric coefficients are shown in Table 32. In regard to the display optical system of the finder of Example 5, basic lens data is shown in Table 33, variable surface distances are shown in Table 34, and aspheric coefficients are shown in Table 35.

TABLE 29

Example 5: Observation Optical System

| Sn | R | D | Nd | νd |
|---|---|---|---|---|
| *1 | −91.4527 | 1.2014 | 1.58913 | 61.15 |
| *2 | 17.4799 | 2.8147 | | |
| 3 | −91.3331 | 0.7000 | 1.88300 | 40.80 |
| 4 | 83.7663 | 0.3886 | | |
| 5 | ∞ | 7.6914 | 1.70155 | 41.14 |
| 6 | ∞ | 7.6914 | 1.70155 | 41.14 |
| 7 | ∞ | 0.0884 | | |
| 8 | −2877.5776 | 0.7217 | 1.89286 | 20.36 |
| 9 | 34.3564 | dd[9] | | |
| 10 | 22.1438 | 3.6348 | 1.95375 | 32.32 |
| 11 | −49.6425 | dd[11] | | |
| *12 | −36.6403 | 0.7025 | 1.63351 | 23.63 |
| *13 | −62.4403 | 0.6223 | | |
| 14 | ∞ | 1.0000 | 1.51680 | 64.20 |
| 15 | ∞ | 17.5000 | | |
| 16(EP) | ∞ | | | |

TABLE 30

Example 5: Observation Optical System

| Diopter | +2 dpt | −1 dpt | −4 dpt |
|---|---|---|---|
| dd[9] | 2.7675 | 1.6134 | 0.4593 |
| dd[11] | 0.4285 | 1.5826 | 2.7367 |

TABLE 31

Example 5: Observation Optical System

| | |
|---|---|
| Angular Magnification | 0.493 |
| Apparent Field of View | 31.5 |

TABLE 32

Example 5: Observation Optical System

| Sn | 1 | 2 |
|---|---|---|
| KA | 1.0000000E+00 | 1.0000000E+00 |
| A3 | 0.0000000E+00 | 0.0000000E+00 |
| A4 | 2.1576600E−04 | 1.2440398E−04 |
| A5 | −2.6861739E−06 | 1.4762705E−05 |
| A6 | −9.1867398E−07 | 6.6220847E−07 |
| A7 | −2.4351854E−08 | −1.0043118E−07 |
| A8 | −1.7519264E−09 | −2.0759953E−08 |
| A9 | −2.3816032E−10 | 5.5921124E−10 |
| A10 | −1.2208206E−11 | −2.6021056E−10 |
| A11 | −3.6169333E−13 | −7.1322233E−12 |
| A12 | −1.2029038E−13 | −3.7847350E−13 |
| A13 | −1.8273418E−14 | 2.9003992E−14 |
| A14 | −2.3263973E−15 | 1.8292649E−14 |
| A15 | −2.3383380E−16 | 5.5047565E−16 |
| A16 | −1.1333223E−17 | −3.9954926E−17 |
| A17 | −1.0502419E−18 | 1.2854286E−16 |
| A18 | −1.6495714E−20 | 2.2930972E−19 |
| A19 | −1.8846021E−20 | −3.6099310E−19 |
| A20 | −3.4136139E−21 | −1.1869477E−19 |

TABLE 32-continued

Example 5: Observation Optical System

| Sn | 12 | 13 |
|---|---|---|
| KA | 1.0000000E+00 | 1.0000000E+00 |
| A4 | 5.1774874E−04 | 5.6780313E−04 |
| A6 | −5.0017595E−06 | −5.4200086E−06 |
| A8 | 5.2941184E−08 | 8.0766896E−08 |
| A10 | −3.8461498E−10 | −6.4725460E−10 |

TABLE 33

Example 5: Display Optical System

| Sn | R | D | Nd | ννd |
|---|---|---|---|---|
| 1 | ∞ | 0.7000 | 1.51680 | 64.20 |
| 2 | ∞ | 4.3000 | | |
| 3 | ∞ | 0.5000 | 1.49023 | 57.49 |
| 4 | ∞ | 0.5000 | | |
| 5 | −48.2529 | 2.4750 | 2.00331 | 28.32 |
| 6 | −14.6129 | 0.9621 | | |
| 7 | −10.2779 | 0.6063 | 1.95906 | 17.47 |
| 8 | −90.2202 | 0.3513 | | |
| 9 | −45.4782 | 4.6969 | 1.90070 | 37.05 |
| 10 | −14.3578 | 0.1276 | | |
| 11 | ∞ | 8.6914 | 1.70155 | 41.14 |
| 12 | ∞ | 7.6914 | 1.70155 | 41.14 |
| 13 | ∞ | 0.0884 | | |
| 14 | −2877.5776 | 0.7217 | 1.89286 | 20.36 |
| 15 | 34.3564 | dd[15] | | |
| 16 | 22.1438 | 3.6348 | 1.95375 | 32.32 |
| 17 | −49.6425 | dd[17] | | |
| *18 | −36.6403 | 0.7025 | 1.63351 | 23.63 |
| *19 | −62.4403 | 0.6223 | | |
| 20 | ∞ | 1.0000 | 1.51680 | 64.20 |
| 21 | ∞ | 17.5000 | | |
| 22(EP) | ∞ | | | |

TABLE 34

Example 5: Display Optical System

| Diopter | +2 dpt | −1 dpt | −4 dpt |
|---|---|---|---|
| dd[15] | 2.7675 | 1.6134 | 0.4593 |
| dd[17] | 0.4285 | 1.5826 | 2.7367 |

TABLE 35

Example 5: Display Optical System

| Sn | 18 | 19 |
|---|---|---|
| KA | 1.0000000E+00 | 1.0000000E+00 |
| A4 | 5.1774874E−04 | 5.6780313E−04 |
| A6 | −5.0017595E−06 | −5.4200086E−06 |
| A8 | 5.2941184E−08 | 8.0766896E−08 |
| A10 | −3.8461498E−10 | −6.4725460E−10 |

The corresponding values of the conditional expressions (1) to (6) of the finder of each of Examples 1 to 5 are shown in Table 36. In Examples 1 to 5, d line is set as a reference wavelength. Table 36 shows values with respect to d line.

TABLE 36

| Expression No. | | Example 1 | Example 2 | Example 3 | Example 4 | Example 5 |
|---|---|---|---|---|---|---|
| (1) | −(M/f3) × AL | 0.135 | 0.108 | 0.128 | 0.135 | 0.078 |
| (2) | AL/f2 | 1.333 | 1.430 | 1.464 | 1.484 | 1.366 |

TABLE 36-continued

| Expression No. | | Example 1 | Example 2 | Example 3 | Example 4 | Example 5 |
|---|---|---|---|---|---|---|
| (3) | −fP/f3 | 0.335 | 0.340 | 0.380 | 0.395 | 0.227 |
| (4) | NdLb3 | 1.53389 | 1.63351 | 1.63351 | 1.63351 | 1.63351 |
| (5) | fN/f3 | 0.173 | 0.174 | 0.193 | 0.196 | 0.112 |
| (6) | fN/BL | −3.388 | −4.403 | −3.453 | −3.162 | −3.104 |

As can be understood from the above data, in the finder of each of Examples 1 to 5, diopter adjustment can be performed, reduction in size is achieved, a high angular magnification is achieved, and aberrations are satisfactorily corrected. Accordingly, high optical performance is implemented.

Figure 17:
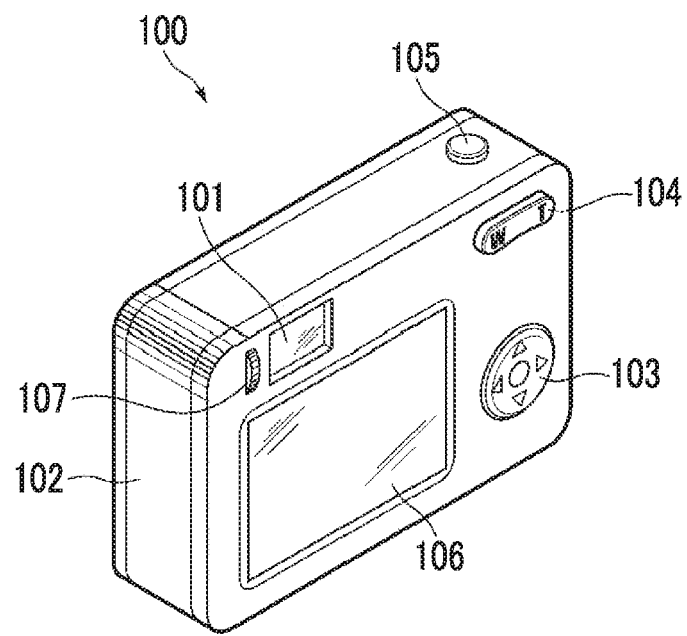
FIG. 17 is a perspective view showing a rear side of an imaging device according to an embodiment of the present disclosure.

Next, an imaging device according to an embodiment of the invention will be described. FIG. 17 is a perspective view showing the schematic configuration of a rear side of a camera 100 according to an embodiment of an imaging device of the invention. The camera 100 comprises a finder 101 according to the embodiment of the invention in an upper portion of a camera body 102, and a diopter adjustment dial 107 that is used to perform diopter adjustment. The finder 101 comprises the observation optical system and the display optical system described above.

The camera 100 comprises, on the rear surface of the camera body 102, operation buttons 103 that are used to perform various settings, a zoom lever 104 that is used to perform variable magnification, and a monitor 106 that displays images and various setting screens. The camera 100 comprises a shutter button 105 on an upper surface of the camera body 102. The camera 100 comprises an imaging lens (not shown) on a front surface of the camera body 102. The camera 100 comprises an imaging element (not shown) that captures a subject image formed by the imaging lens inside the camera body 102. The subject image captured by the imaging element is displayed on a display element (not shown in FIG. 17) of the finder 101.

The camera 100 has an optical view finder function that can observe an optical image obtained by the observation optical system, and an electronic view finder function that can observe an image displayed on the display element. In the camera 100, an image where at least a part of the image displayed on the display element is superimposed on the optical image can be also observed.

Although an example of the finder embedded in the camera 100 is shown in FIG. 17, the technique of the present disclosure can also be applied to an external finder. The imaging device according to the embodiment of the present disclosure is not limited to the above-described example, for example, various aspects, such as a video camera, can be used.

Although the technique of the present disclosure has been described above through the embodiments and the examples, the technique of the present disclosure is not limited to the above-described embodiments and examples, and various modifications can be made. For example, the radius of curvature, the surface distance, the refractive index, the Abbe number, the aspheric coefficient, and the like of each lens are not limited to the values shown in the above-described examples, and may take other values.

What is claimed is:

1. A reverse Galileo type finder comprising, in order from an object side to an eye point side:
   an objective lens group having a negative refractive power; and
   an eyepiece lens group having a positive refractive power,
   wherein a lens distance between the objective lens group and the eyepiece lens group is longest among lens distances at an air conversion length in an observation optical system from the objective lens group to the eyepiece lens group,
   the eyepiece lens group consists of, in order from the object side to the eye point side, a first lens having a negative refractive power, a second lens having a positive refractive power, and a third lens having a negative refractive power,
   during diopter adjustment, the first lens and the third lens remain stationary with respect to an eye point, and the second lens moves along an optical axis,
   in a case where an angular magnification of the observation optical system in a state in which a diopter is −1 is M,
   a focal length of the third lens is f3, and
   a sum of a thickness of the objective lens group on the optical axis, a thickness of the eyepiece lens group on the optical axis, and an air conversion length on the optical axis from a most eye point-side lens surface of the objective lens group and a most object-side lens surface of the eyepiece lens group is AL, a conditional expression (1) is satisfied, $$0.01<-(M/f3)\times AL<0.16 \qquad (1),\text{ and}$$

in a case where a focal length of the eyepiece lens group is fP, a conditional expression (3) is satisfied, $$0.15<-fP/f3<0.45 \qquad (3).$$

2. The finder according to claim 1,
wherein, in a case where a focal length of the second lens is f2, a conditional expression (2) is satisfied, $$1<AL/f2<2 \qquad (2).$$

3. The finder according to claim 1,
wherein, in a case where a refractive index of the third lens with respect to d line is NdLb3, a conditional expression (4) is satisfied, $$1.48<NdLb3<1.66 \qquad (4).$$

4. The finder according to claim 1,
wherein, in a case where a focal length of the objective lens group is fN, a conditional expression (5) is satisfied, $$0.05<fN/f3<0.25 \qquad (5).$$

5. The finder according to claim 1, further comprising:
another optical system that is different from the observation optical system outside an optical path of the observation optical system and comprises a display element; and
an optical path combination member that combines an optical path of the other optical system and the optical path of the observation optical system and that is disposed between the objective lens group and the eyepiece lens group.

6. The finder according to claim 5,
wherein, in a case where a focal length of the objective lens group is fN, and
a distance on the optical axis from a most object-side surface of the objective lens group to a most object-side surface of the optical path combination member is BL, a conditional expression (6) is satisfied, $$-5.5 < fN/BL < -1.5 \tag{6}$$

7. The finder according to claim 5,
wherein the other optical system comprises, as lenses, only three lenses consisting of two lenses having a positive refractive power and one lens having a negative refractive power.

8. The finder according to claim 1,
wherein a conditional expression (1-1) is satisfied, $$0.02 < -(M/f3) \times AL < 0.15 \tag{1-1}$$

9. The finder according to claim 2,
wherein a conditional expression (2-1) is satisfied, $$1.2 < AL/f2 < 1.8 \tag{2-1}$$

10. The finder according to claim 1,
wherein a conditional expression (3-1) is satisfied, $$0.2 < -fP/f3 < 0.4 \tag{3-1}$$

11. The finder according to claim 3,
wherein a conditional expression (4-1) is satisfied, $$1.5 < NdLb3 < 1.64 \tag{4-1}$$

12. The finder according to claim 4,
wherein a conditional expression (5-1) is satisfied, $$0.1 < fN/f3 < 0.2 \tag{5-1}$$

13. The finder according to claim 6,
wherein a conditional expression (6-1) is satisfied, $$-5 < fN/BL < -2 \tag{6-1}$$

14. An imaging device comprising:
the finder according to claim 1.

15. The finder according to claim 1,
wherein a conditional expression (3-2) is satisfied, $$0.15 < -fP/f3 < 0.4 \tag{3-2}$$

* * * * *